United States Patent
Miyashita et al.

(10) Patent No.: US 6,797,198 B1
(45) Date of Patent: Sep. 28, 2004

(54) LIQUID-CRYSTALLINE POLYMER COMPOSITION

(75) Inventors: Takayuki Miyashita, Shizuoka (JP); Mineo Ohtake, Shizuoka (JP); Hirokazu Ohshiba, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 71 days.

(21) Appl. No.: 10/089,183

(22) PCT Filed: Oct. 4, 2000

(86) PCT No.: PCT/JP00/06910
§ 371 (c)(1),
(2), (4) Date: Mar. 27, 2002

(87) PCT Pub. No.: WO01/27205
PCT Pub. Date: Apr. 19, 2001

(30) Foreign Application Priority Data

Oct. 8, 1999 (JP) ............................................ 11-287808

(51) Int. Cl.⁷ .............................................. C09K 19/52
(52) U.S. Cl. .................... 252/299.01; 428/357; 106/415
(58) Field of Search ....................... 252/299.01, 294.1, 252/299.2, 299.3, 299.4, 299.5, 299.6, 299.61, 299.62, 299.63, 299.64, 299.65, 299.66, 299.67, 299.68, 299.7; 428/357; 106/401, 415–417, 316

(56) References Cited

U.S. PATENT DOCUMENTS

| | | | |
|---|---|---|---|
| 4,889,886 A | | 12/1989 | Wada et al. |
| 5,085,807 A | * | 2/1992 | Okamoto et al. ............ 252/609 |
| 5,268,410 A | * | 12/1993 | Yamada et al. .............. 524/425 |
| 5,399,608 A | * | 3/1995 | Allen et al. .................. 524/413 |
| 5,610,219 A | * | 3/1997 | Takatani et al. ............. 524/413 |
| 5,804,634 A | * | 9/1998 | Umetsu et al. .............. 524/466 |
| 5,851,668 A | * | 12/1998 | Sandor et al. ............... 428/397 |
| 5,912,320 A | * | 6/1999 | Hotta et al. .................. 528/373 |
| 5,976,406 A | | 11/1999 | Nagano et al. |
| 6,063,848 A | * | 5/2000 | Murakami et al. ........... 524/413 |

FOREIGN PATENT DOCUMENTS

| | | |
|---|---|---|
| EP | 271326 A2 | 6/1988 |
| EP | 856536 A2 | 8/1998 |
| JP | 08-325446 A | 12/1996 |
| JP | 09-176377 A | 7/1997 |
| JP | 2000-178443 A | 6/2000 |

* cited by examiner

Primary Examiner—Shean C. Wu
Assistant Examiner—Jennifer R. Sadula
(74) Attorney, Agent, or Firm—Burns, Doane, Swecker & Mathis, L.L.P.

(57) ABSTRACT

This invention offers a liquid crystal polymer which exhibits an excellent low warp and is advantageously used especially as a connector or the like. That is, a liquid crystal polymer composition in which a plate-shaped filler (B) in an amount of 5–100 parts by weight satisfying the following formulae (1) and (2) and having an average particle diameter of 0.5–100 μm is compounded with 100 parts by weight of a liquid crystal polymer (A).

$$D/W \leq 5 \quad (1)$$

$$3 \leq W/H \leq 200 \quad (2)$$

wherein D is the maximum particle diameter of the plate-shaped filler (B), and the direction of the diameter D is defined as "x"; W is a particle's diameter which is in the direction y at the right angle to the direction x; and H is a thickness of the particle in the direction of z which is vertical to the xy-plane.

20 Claims, 1 Drawing Sheet

LIQUID-CRYSTALLINE POLYMER COMPOSITION

FIELD OF THE INVENTION

The present invention relates to a liquid crystal polymer composition containing a specific plate-shaped filler. More specifically, it relates to a liquid crystal polymer composition which has an excellent low warp and is advantageously used in particular as a connector or the like requiring a low warp after molding and during reflow heating.

PRIOR ART

A liquid crystal polymer capable of forming an anisotropic molten phase has been known to be, among thermoplastic resins, a material which is excellent in dimensional accuracy and damping property and generating little flash during molding. A liquid crystal polymer composition reinforced with glass fibers upon making use of such characteristics has been often employed so far as an SMT-adapted connector. In recent years, however, a connector has been further reduced in weight, thickness and size, and such problems have arisen that warp deformation occurs after molding and during reflow heating owing to an unsatisfactory rigidity caused by an insufficient thickness of a molded article or an internal stress caused by inserting metallic terminals, which results in defective soldering with a substrate. That is, the ordinary reinforcement with glass fibers only has been problematic in that when amounts of glass fibers are increased for enhancing a rigidity, a thin portion is not filled with a resin and terminals inserted are deformed due to a pressure in molding. Thus, materials that can solve all these problems have not existed.

DISCLOSURE OF THE INVENTION

In view of the foregoing problems, the present inventors have assiduously conducted investigations on materials having an excellent low warp, and have consequently found that by compounding a specific amount of a specific plate-shaped filler with a liquid crystal polymer a low warp can be improved without notably decreasing mechanical properties. This finding has led to the completion of the invention.

That is, the invention is to provide a liquid crystal polymer composition in which 5 to 100 parts by weight of a plate-shaped filler (B) satisfying the following formulae (1) and (2) and having an average particle diameter of 0.5 to 100 μm are compounded with 100 parts by weight of a liquid crystal polymer (A).

$$D/W \leq 5 \quad (1)$$

$$3 \leq W/H \leq 200 \quad (2)$$

The invention is a composition comprising (A) and (B)

DETAILED DESCRIPTION OF THE INVENTION

The invention is described in detail below. The liquid crystal polymer (A) used in the invention refers to a melt-processible polymer capable of forming an optically anisotropic molten phase. Properties of an anisotropic molten phase can be identified by an ordinary polarization detecting method using crossed polarizers. More specifically, identification of an anisotropic molten phase can be performed by observing a molten sample put on a Leitz hot stage in a nitrogen atmosphere at 40× magnification using a Leitz polarizing microscope. The liquid crystal polymer which can be applied to the invention usually transmits polarized light even in a molten stationary state in the examination between crossed polarizers, optically exhibiting an anisotropy.

The liquid crystal polymer (A) is not particularly limited. An aromatic polyester or an aromatic polyester amide is preferable, and a polyester partially containing an aromatic polyester or an aromatic polyester amide in the same molecular chain is also included in its range. Those having an inherent viscosity (I.V.) of, preferably at least approximately 2.0 dl/g, more preferably 2.0 to 10.0 dl/g when dissolved in pentafluorophenol at 60° C. in a concentration of 0.1% by weight are used.

The aromatic polyester or the aromatic polyester amide as the liquid crystal polymer (A) which can be applied to the invention is especially preferably an aromatic polyester or an aromatic polyester amide containing, as a constituent, at least one compound selected from the group consisting of an aromatic hydroxycarboxylic acid, an aromatic hydroxyamine and an aromatic diamine.

Specific examples thereof include (1) a polyester mainly comprising at least one of an aromatic hydroxycarboxylic acid and derivatives thereof;

(2) a polyester mainly comprising (a) at least one of an aromatic hydroxycarboxylic acid and derivatives thereof, (b) at least one of an aromatic dicarboxylic acid, an alicyclic dicarboxylic acid and derivatives thereof and (c) at least one of an aromatic diol, an alicyclic diol, an aliphatic diol and derivatives thereof;

(3) a polyester amide mainly comprising (a) at least one of an aromatic hydroxycarboxylic acid and derivatives thereof, (b) at least one of an aromatic hydroxyamine, an aromatic diamine and derivatives thereof and (c) at least one of an aromatic dicarboxylic acid, analicyclic dicarboxylic acid and derivatives thereof; and (4) a polyester amide mainly comprising (a) at least one of an aromatic hydroxycarboxylic acid and derivatives thereof, (b) at least one of an aromatic hydroxyamine, an aromatic diamine and derivatives thereof, (c) at least one of an aromatic dicarboxylic acid, analicyclic dicarboxylic acid and derivatives thereof and (d) at least one of an aromatic diol, an alicyclic diol, an aliphatic diol and derivatives thereof. Further, a molecular weight modifier may be used in combination with the foregoing components.

Preferable examples of the specific compounds constituting the liquid crystal polymer (A) which can be applied to the invention include aromatic hydroxycarboxylic acids such as p-hydroxybenzoic acid and 6-hydroxy-2-naphthoic acid; aromatic diols such as 2,6-dihydroxynaphthalene, 1,4-dihydroxynaphthalene, 4,4'-dihydroxybiphenyl, hydroquinone, resorcin and compounds represented by the following formulae (I) and (II); aromatic dicarboxylic acids such as terephthalic acid, isophthalic acid, 4,4'-diphenyldicarboxylic acid, 2,6-naphthalenedicarboxylic acid and compounds represented by the following formula (III); and aromatic diamines such as p-aminophenol and p-phenylenediamine.

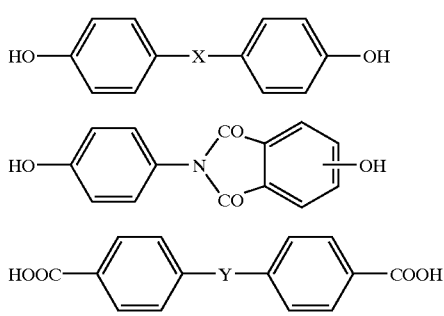

An especially preferable liquid crystal polymer (A) which is applied to the invention is an aromatic polyester amide containing p-hydroxybenzoic acid, 6-hydroxy-2-naphthoic acid, terephthalic acid and p-aminophenol as main structural unit components.

In order to attain the low warp aimed at by the invention, it is required to compound 5 to 100 parts by weight of a specific plate-shaped filler (B) with 100 parts by weight of the liquid crystal polymer (A).

The plate-shaped filler (B) used in the invention has to satisfy the following formulae (1) and (2). That is, it refers to a disk-shaped, square plate-shaped, rectangular plate-shaped or indefinite plate-shaped material which has dimensions in two directions but not in the remaining one direction. Its average particle diameter is 0.5 to 100 μm.

$$D/W \leq 5 \quad (1)$$

$$3 \leq W/H \leq 200 \quad (2)$$

wherein D is the maximum particle diameter of the plate-shaped filler (B), the direction of the diameter D is defined as x, W is a particle's diameter which is in the direction y at the right angle to the direction x, and H is a thickness of the particle in the direction z which is vertical to the xy-plane.

Specific examples of such a plate-shaped filler include talc, mica, kaolin, clay, graphite, vermiculite, silicates such as calcium silicate, aluminum silicate and feldspar powder, Japanese acid clay, agalmatolite clay, sericite, sillimanite, bentonite, glass flake, slate powder and silane; carbonates such as calcium carbonate, chalk, barium carbonate, magnesium carbonate and dolomite; sulfates such as barite powder, precipitated calcium sulfate, calcined gypsum and barium sulfate; hydroxides such as hydrated alumina; oxides such as alumina, antimony oxide, magnesia, titanium oxide, zinc oxide, silica, siliceous sand, quartz, white carbon and diatomaceous earth, sulfides such as molybdenum disulfide; substances comprising the materials such as plate-shaped wollastonite and metallic powders.

Of these, talc, mica, kaolin, clay and graphite are preferable in view of properties.

For attaining the low warp, the higher the content of the plate-shaped filler, the better. However, when the content is too high, an extrudability and a moldability, especially, a fluidity, are worsened, and further mechanical strengths are decreased. Moreover, when the content is too low, the low warp is not exhibited. Accordingly, the content of the plate-shaped filler (B) is 5 to 100 parts by weight, preferably 10 to 60 parts by weight per 100 parts by weight of the liquid crystal polymer (A).

In addition, for improving mechanical properties, a fibrous filler (C) having an average fiber diameter of 5 to 20 μm and an average aspect ratio of at least 15 can further be compounded.

As the fibrous filler (C), a glass fiber, a milled carbon fiber, a fibrous wollastonite, a whisker, a metallic fiber, an inorganic filler and an ore fiber can be used. As the milled carbon fiber, a PAN fiber containing polyacrylonitrile as a starting material and a pitch fiber containing a pitch as a starting material are used.

As the whisker, a silicon nitride whisker, a silicon trinitride whisker, a basic magnesium sulfate whisker, a barium titanate whisker, a silicon carbide whisker and a boron whisker are used.

As the metallic fiber, fibers of soft steel, stainless steel, steel and alloys thereof, brass, aluminum, and alloys thereof and lead are used.

As the inorganic fiber, fibers of rock wool, zirconia, alumina silica, potassium titanate, barium titanate, titanium oxide, silicon carbide, alumina, silica and blast furnace slag are used.

As the ore fiber, asbestos is used.

Of these, a glass fiber is preferable in view of properties. As the glass fiber, ordinary glass fibers as well as glass fibers coated with metals such as nickel and copper and a silane fiber are available.

With respect to the content of the fibrous filler for attaining the low warp, when the content is too high, an extrudability and a moldability, especially a fluidity are worsened. Meanwhile, when the content is too low, mechanical properties are decreased. Accordingly, the content of the fibrous filler (C) is 5 to 100 parts by weight, preferably 10 to 50 parts by weight per 100 parts by weight of the liquid crystal polymer (A).

In this case, the plate-shaped filler (B) serves to improve the low warp. However, when the content is too high, an extrudability and a moldability are worsened to make the material brittle. The fibrous filler (C) serves to improve mechanical properties. However, when the content is too high, deformation in reflow is increased. Consequently, the total content of components (B) and (C) has to be 150 parts by weight or less, preferably 100 parts by weight or less per 100 parts by weight of the liquid crystal polymer (A).

The plate-shaped filler and the fibrous filler used in the invention can be used by themselves. It is also possible to use a known surface treating agent and a known binder which are generally used, together with the fillers.

A composition to which desired properties are imparted by adding a nucleating agent, a pigment such as a carbon black or the like, an antioxidant, a stabilizer, a plasticizer, a lubricant, a release agent and a fire retardant to a liquid crystal polymer composition is also included in the range of the liquid crystal polymer composition referred to in the invention.

In the liquid crystal polymer composition of the invention, one or more fillers are used to compensate the respective defects, whereby a material having an excellent low warp is obtained without impairing mechanical properties. Further, fillers are uniformly dispersed in a molded article, and a higher performance is exhibited in a dispersed state where plate-shaped fillers are present between fibrous fillers.

Such a liquid crystal polymer composition can be produced by compounding both components at the foregoing composition ratios and extruding the same. Usually, they are extruded into pellets with an extruder, and the pellets are used in injection molding. However, the production with the extruder is not critical.

EXAMPLES

Figure 1:
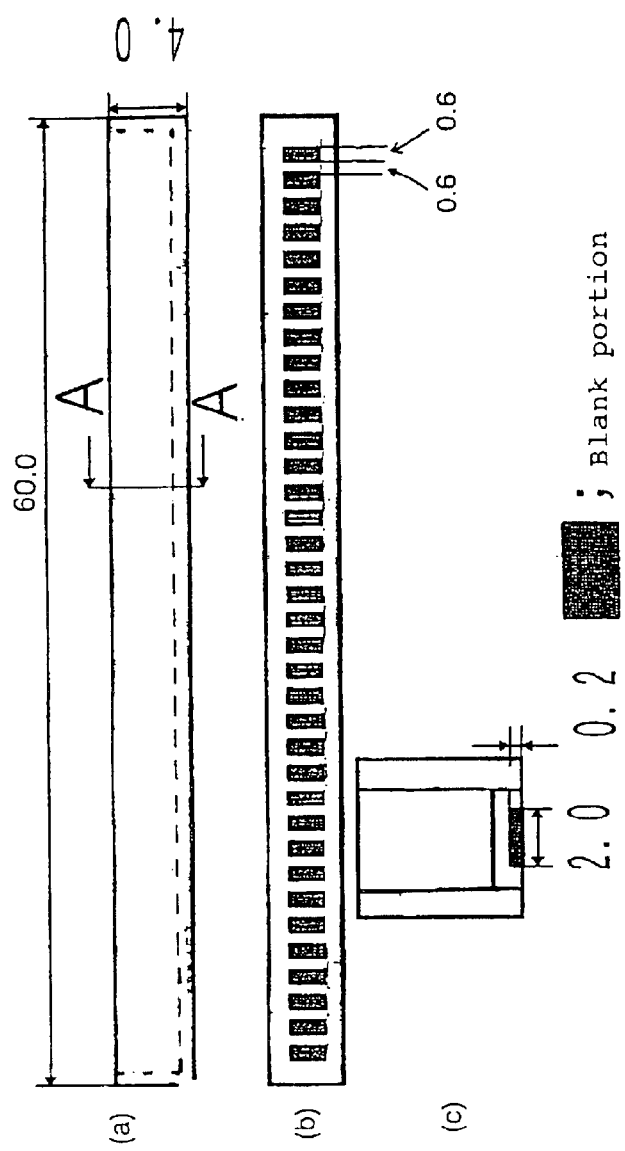
FIG. 1 is a view showing a shape of a connector test piece used in Examples. (a) is a front view, (b) a bottom view and (c) a sectional view taken along line A—A of (a).

The invention is illustrated specifically by referring to Examples. However, the invention is not limited thereto. The measurements of the properties and the tests in Examples were conducted by the following methods.

(1) Measurement of an Average Particle Diameter of a Plate-shaped Filler

An average particle diameter was measured by a laser scattering method, and shown in terms of a cumulative 50% average particle diameter.

(2) Measurement of the Shape (D/W, W/H) of a Plate-shaped Filler

Pellets of a liquid crystal polymer composition extruded with a composition shown in Table 1 were burned at 600° C. Then, a filler remaining as an ash was photographed using a scanning electron microscope. This photograph was subjected to image analysis, and its average value was calculated.

(3) Tensile Test

A tensile strength and a tensile elongation were measured according to ASTM D638 using an ASTM No. 1 dumbbell test piece.

(4) Flexural Test

A flexural strength and a flexural modulus were measured according to ASTM D790 using a flexural test piece having a size of 130×13×0.8 mm.

(5) Measurement of a Flatness of a Flat Plate

A flat plate having a size of 60×60×0.7 mm was fixed on a level plate (platen) at three points. A height of a position which was raised most from the platen was measured, and an average of three plates was obtained.

(6) Measurement of a Warp of a Connector Shape

In a connector-type test piece having a pitch between terminals of 0.6 mm, an average thickness (t) of 0.3 mm and an external size of 4 mm (width)×4 mm (height)×60 mm (length) and provided with blank portions as shown in FIG. 1, a distance between a straight line obtained by binding points of both ends of the fixed surface of a connector and a central point thereof was measured, and an average of 10 connectors was obtained.

Examples 1 to 8 and Comparative Examples 1 to 6

Each filler shown in Table 1 at a ratio shown in Table 1 was dry-blended with 100 parts by weight of a liquid crystal polyester (LCP; Vectra E950i manufactured by Polyplastics Co., Ltd.), and the mixture was then melt-extruded and pelletized with a twin-screw extruder (PCM-30 manufactured by Ikegai Iron Works, Ltd.). The foregoing test pieces were produced from the pellets using an injection molding machine, and evaluated. The results shown in Table 1 were then obtained.

TABLE 1

| | (A) LCP (parts by weight) | Filler (parts by weight) | | | Average particle size of (B) plate shaped filler (μm) | Shape of (B) plate-shaped filler | | Tensile test | | Flexural test | | Flatness of flat plate (mm) | Warp of connector shape (mm) |
|---|---|---|---|---|---|---|---|---|---|---|---|---|---|
| | | (B) plate-shaped | (C) fibrous | others | | D/W | W/H | Tensile strength (MPa) | Tensile elongation (%) | Flexural strength (MPa) | Flexural modulus (MPa) | | |
| Ex. 1 | 100 | talc 50 | | | 10.5 | 1.1 | 12 | 119 | 2.8 | 158 | 13900 | 0.12 | 0.269 |
| Comp. Ex. 1 | 100 | | GF 50 | | — | — | — | 178 | 2.0 | 240 | 21400 | 0.89 | 0.545 |
| Ex. 2 | 100 | talc 60 | GF 20 | | 10.1 | 1.1 | 11 | 120 | 2.5 | 160 | 14700 | 0.10 | 0.230 |
| Ex. 3 | 100 | talc 20 | GF 30 | | 9.8 | 1.0 | 11 | 140 | 2.7 | 202 | 16700 | 0.07 | 0.230 |
| Ex. 4 | 100 | fine talc 20 | GF 30 | | 1.3 | 1.3 | 4 | 137 | 2.8 | 191 | 16700 | 0.18 | 0.220 |
| Ex. 5 | 100 | mica 20 | GF 30 | | 19.2 | 1.5 | 42 | 138 | 2.5 | 199 | 17300 | 0.20 | 0.272 |
| Ex. 6 | 100 | kaolin 20 | GF 30 | | 5.0 | 1.2 | 7 | 135 | 2.6 | 189 | 16500 | 0.25 | 0.270 |
| Ex. 7 | 100 | graphite 20 | GF 30 | | 15.5 | 1.2 | 21 | 132 | 2.7 | 187 | 16200 | 0.35 | 0.285 |
| Ex. 8 | 100 | wollastonite 20 | GF 30 | | 5.0 | 2.4 | 3 | 132 | 2.8 | 190 | 16800 | 0.32 | 0.232 |
| Comp. Ex. 2 | 100 | wollastonite 20 | GF 30 | | 20.3 | 5.0 | 1.2 | 140 | 2.5 | 210 | 17700 | 0.95 | 0.319 |
| Comp. Ex. 3 | 100 | wollastonite 20 | GF 30 | | 89.5 | 8.4 | 3 | 147 | 2.3 | 223 | 18500 | 0.89 | 0.332 |
| Comp. Ex. 4 | 100 | | GF 30 | spherical silica 20 | — | — | — | 139 | 2.5 | 202 | 17700 | 12.13 | 0.360 |
| Comp. Ex. 5 | 100 | | GF 30 | titanium oxide 20 | — | — | — | 136 | 2.6 | 183 | 15200 | 4.42 | 0.471 |
| Comp. Ex. 6 | 100 | | GF 30 | calcium pyro-phosphate 20 | — | — | — | 140 | 2.6 | 202 | 17200 | 8.55 | 0.378 |

*GF: glass fiber having an average fiber diameter of 10 μm, and an aspect ratio of 40

What is claimed is:

1. A liquid crystal polymer composition comprising 100 parts by weight of a liquid crystal polymer (A) and 5–100 parts by weight of a plate-shaped filler (B) wherein the plate-shaped filler satisfies the following formulae (1) and (2) and has an average particle diameter of 0.5–100 μm.

$$D/W \leq 5 \qquad (1)$$

$$3 \leq W/H \leq 200 \qquad (2)$$

wherein D is the maximum particle diameter of the plate-shaped filler (B), and the direction of the diameter D is defined as x; W is a particle's diameter which is in the direction y at the right angle to the direction x; and H is a thickness of the particle in the direction of z which is vertical to the xy-plane.

2. The composition according to claim 1, wherein 5–100 parts by weight of a fibrous filler (C) having an average fiber diameter of 5–20 μm and an average aspect ratio of at least 15 are further compounded therewith to 100 parts by weight of the liquid crystal polymer (A).

3. The composition according to claim 2, wherein the fibrous filler (C) is glass fiber.

4. The composition according to claim 3, wherein the liquid crystal polymer (A) is a polyester amide.

5. A connector which is manufactured from the composition according to claim 3.

6. The composition according to claim 2, wherein the plate-shaped filler (B) consists of at least one substance selected from talc, mica, kaolin and graphite.

7. The composition according to claim 6, wherein the fibrous filler (C) is glass fiber.

8. The composition according to claim 7, wherein the liquid crystal polymer (A) is a polyester amide.

9. The composition according to claim 6, wherein the liquid crystal polymer (A) is a polyester amide.

10. A connector which is manufactured from the composition according to claim 6.

11. The composition according to claim 2, wherein the liquid crystal polymer (A) is a polyester amide.

12. A connector which is manufactured from the composition according to claim 2.

13. The composition according to claim 1, wherein the plate-shaped filler (B) consists of at least one substance selected from talc, mica, kaolin and graphite.

14. The composition according to claim 13, wherein the fibrous filler (C) is glass fiber.

15. The composition according to claim 14, wherein the liquid crystal polymer (A) is a polyester amide.

16. The composition according to claim 13, wherein the liquid crystal polymer (A) is a polyester amide.

17. A connector which is manufactured from the composition according to claim 13.

18. The composition according to claim 7, wherein the liquid crystal polymer (A) is a polyester amide.

19. A connector which is manufactured from the composition according to claim 1.

20. The composition according to claim 1, wherein the plate-shaped filler (B) satisfies a D/W of formula (1) of $\leq 2.4$, and satisfies W/H of formula (2) of 3 to 42.

* * * * *